United States Patent
Thueringer et al.

(10) Patent No.: US 9,513,609 B2
(45) Date of Patent: Dec. 6, 2016

(54) WIRELESS COMMUNICATIONS USING ACTIVE MODULATION

(71) Applicant: NXP B.V., Eindhoven (NL)

(72) Inventors: Peter Thueringer, Graz (AT); Klemens Breitfuss, Voitsberg (AT)

(73) Assignee: NXP B.V., Eindhoven (NL)

( * ) Notice: Subject to any disclaimer, the term of this patent is extended or adjusted under 35 U.S.C. 154(b) by 587 days.

(21) Appl. No.: 13/757,028

(22) Filed: Feb. 1, 2013

(65) Prior Publication Data

US 2014/0218176 A1    Aug. 7, 2014

(51) Int. Cl.
| | | |
|---|---|---|
| H04Q 5/22 | (2006.01) | |
| G05B 13/02 | (2006.01) | |
| G06K 7/10 | (2006.01) | |
| G06K 19/077 | (2006.01) | |
| H04B 5/00 | (2006.01) | |

(52) U.S. Cl.
CPC ........... *G05B 13/02* (2013.01); *G06K 7/10009* (2013.01); *G06K 19/07749* (2013.01); *H04B 5/0031* (2013.01); *H04B 5/0062* (2013.01); *H04B 5/0081* (2013.01)

(58) Field of Classification Search
None
See application file for complete search history.

(56) References Cited

U.S. PATENT DOCUMENTS

| | | | | |
|---|---|---|---|---|
| 2005/0052283 A1* | 3/2005 | Collins et al. | ............. | 340/572.7 |
| 2005/0077356 A1* | 4/2005 | Takayama | .......... | G06K 7/10237 235/451 |
| 2008/0055091 A1* | 3/2008 | Song | .................. | G06K 7/10237 340/572.5 |
| 2008/0088417 A1* | 4/2008 | Smith | ................ | G06K 19/0707 340/10.41 |
| 2008/0194200 A1* | 8/2008 | Keen | ..................... | G06K 7/0008 455/41.1 |
| 2008/0254756 A1 | 10/2008 | Kawakubo et al. | | |
| 2008/0292029 A1* | 11/2008 | Koslov | ......................... | 375/341 |
| 2009/0174592 A1* | 7/2009 | Muellner | ................. | H04B 1/00 342/51 |
| 2009/0184805 A1 | 7/2009 | Yamada | | |
| 2009/0303004 A1* | 12/2009 | Tuttle | ..................... | G01S 11/10 340/10.1 |
| 2010/0134256 A1* | 6/2010 | Mihota | ........................ | 340/10.1 |
| 2010/0187308 A1 | 7/2010 | Busch-Sorensen | | |
| 2011/0215158 A1* | 9/2011 | Kargl et al. | .................... | 235/492 |
| 2012/0071089 A1 | 3/2012 | Charrat | | |
| 2012/0071090 A1* | 3/2012 | Charrat | ............ | G06K 19/07771 455/41.1 |
| 2013/0130614 A1 | 5/2013 | Busch-Sorensen | | |
| 2014/0003548 A1* | 1/2014 | Lefley | .................. | H04B 5/0075 375/268 |
| 2014/0378051 A1* | 12/2014 | Charrat | ............ | G06K 19/07769 455/41.1 |

FOREIGN PATENT DOCUMENTS

WO    2006/010943 A1    2/2006

OTHER PUBLICATIONS

Extended European Search Report for application No. 14153376.0 (Jun. 12, 2014).

(Continued)

*Primary Examiner* — Ojiako Nwugo (57) ABSTRACT

A method of wireless communication, with a circuit that includes a radio frequency identification (RFID) reader, can be carried out using a circuit that is configured and arranged to communicate with RFID cards that use load modulation of an RF carrier provided by the RFID reader. A presence of the radio frequency (RF) carrier is detected on an antenna. A local clock signal is generated. A difference between the local clock signal and the RF carrier is detected. In response to the detected difference, the frequency of the local clock signal is modified to reduce the detected difference. Load modulation of the RF carrier is mimicked by modulating the local clock signal to encode data; and driving the antenna with the modulated local clock signal.

20 Claims, 4 Drawing Sheets

(56) References Cited

OTHER PUBLICATIONS

Radio Frequency Identification: Applications and Implications for Consumers, Federal Trade Commission, Mar. 2005.
NXP, SL3S1203_1213, UCODE G2iL and G2iL+, Product Data Sheet, Rev. 4—Feb. 27, 2012.
Impinj, "True 3D Antenna Technology," 2012, found at: http://www.impinj.com/products/SubOneCol.aspx?id=4527&terms=tag+antenna.
Mpinj Inc., Monza® 4 UHF Gen 2 RFID Tag Chips with True 3D™ and QT™ Technologies, 2010.

* cited by examiner

FIG. 1

WIRELESS COMMUNICATIONS USING ACTIVE MODULATION

Aspects of various embodiments are directed to communications between (RFID) devices using active modulation.

Radio frequency (RF) identification (RFID) devices have a variety of different applications such as tagging an item with a small integrated circuit (IC) chip. The IC chip can be configured to communicate with a reader device using an antenna. The combination chip and antenna (together called a "tag") allows a reader device to access data stored on the chip. A unique identifier (ID) can be stored on the IC chip and accessed by the reader device to facilitate the individual tagging/identification of items by a user of the reader device. For example, each particular saleable good in a store can have its relevant parameters (model number, color, size, etc.) read electronically from a tag. Vehicles with RFID tags can be identified and charged for use of highway tollbooths, which can save time and reduce traffic congestion. Chips can be implanted in devices or animals so that if lost, they can be identified and easily returned to their owners. Depending upon the particular application, a reader device can scan the tag to access the data that it stores. This information can be processed by the reader device, stored in a database or otherwise communicated and processed.

A particular set of RFID devices provide a small, robust and cheap solution for RF communications of relatively small amounts of data. This facilitates their use on a large scale, in rugged conditions and in unobtrusive/space-limited locations. The modulation used in RFID (e.g., as defined by ISO/IEC 18000-3, ISO 14443 or ISO 18092) can be amplitude shift keying (ASK) (either 10% or 100%) for the downlink (reader to tag) and load modulation for the uplink (tag to reader) with a rate defined as a division of the carrier. The load modulation can produce subcarriers that use binary phase shift keying (BPSK) modulation. Communications between a tag and reader are limited by the effective communication distance. This effective communication distance is a function of the RF field strength (e.g., as generated by the reader) and the antenna size and gain characteristics of both devices. Moreover, large differences between the relative size of the antennas of two RIFD devices can adversely affect communications between the devices, including limiting the effective communication distance. For instance, an RFID reader device may have an antenna that is around 10 cm×10 cm. If the tag device has an antenna of around 1 cm×1 cm (or even smaller), then the ratio between antenna size is an undesirable factor of about 100.

While RFID devices can be small, robust and cheap solutions for RF communication of small amounts of data, they could still be useful in devices that have alternative uses. For instance, RFID devices can be used in cellular telephones and other devices with their own power sources. Such uses of RFID devices, however, may present issues when attempting to implement RFID standards that were not originally designed to accommodate this type of usage.

These and other matters have presented challenges to RFID communications, for a variety of applications.

Various example embodiments are directed to radio frequency identification (RFID) communication circuits and their implementation.

According to an example embodiment, a method of wireless communication with a circuit that includes an RFID reader can be carried out using a circuit configured and arranged to communicate with RFID cards that use load modulation of an RF carrier provided by the RFID reader. A presence of the RF carrier is detected on an antenna. A local clock signal is generated. A (phase/frequency) difference between the local clock signal and the RF carrier is detected. In response to the detected difference, the frequency of the local clock signal is modified to reduce the detected difference. Load modulation of the RF carrier is mimicked by modulating the local clock signal to encode data; and driving the antenna with the modulated local clock signal.

Consistent with various embodiments, a device includes a local oscillator circuit configured and arranged to generate a local clock signal. A comparison module is configured and arranged to detect a difference in at least one of frequency and phase of the local clock signal and a wirelessly received radio frequency (RF) carrier, and to generate a control signal in response to the detected difference. An adjustment module is configured and arranged to reduce the detected difference in response to the control signal. An RFID module is configured and arranged to mimic load modulation of the RF carrier by modulating the local clock signal to encode data, and by driving an antenna with the modulated local clock signal The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving radio frequency identification (RFID) devices, methods and system that use active modulation. While not necessarily so limited, various aspects may be appreciated through a discussion of examples using this context.

Various example embodiments are directed to an RFID tag device that is configured and arranged to use active modulation in order to mimic load modulation of an RF field received from an RFID reader device. The mimicking action can be facilitated by creating a local clock that is synchronous to the RF carrier received from the RFID reader device. This can be particularly useful for communications that use long frame lengths. For instance, frequency and phase discrepancies between a local clock and the RF carrier can accumulate over a frame. Accordingly, longer frames can benefit from accurate synchronization between the local clock and the RF carrier.

Certain embodiments are directed toward the use of active modulation by an RFID tag device that is designed to communicate with an RFID reader device that is configured according to an RFID protocol that specifies load modulation by tag devices. Because the tag-generated data is carried on the RF carrier provided from the RFID reader, the RFID protocol may not specify a synchronization protocol that is designed for use with an RFID tag device that actively drives its own RF signal. Accordingly, the RFID tag device can be configured and arranged to mimic load modulation of an RF carrier received from the RFID reader device. In addition to creating an RF modulated signal that is derived from the RF carrier, the amplitude of the RF modulated signal can be set to mimic an RFID tag device having an antenna with a larger gain. In this manner, the RFID tag device with a small form factor antenna (having a correspondingly small gain) can approximate/mimic an RFID tag device having a large form factor antenna.

Particular embodiments are directed toward RFID tag devices designed for use in mobile devices that include, but are not necessarily limited to, cellular telephones, smart phones, and tablets. The amount of available physical space can be limited in such mobile devices. Accordingly, an RFID tag device is designed to use only a small amount of physical real estate. In particular, the antenna of the RFID tag device can be limited to a small size. In some instances, the antenna size can be at or under 510 mm$^2$ (e.g., 30 mm×17 mm). In other instances, the antenna size can be at or under 100 mm$^2$ (e.g., 10 mm×10 mm). These sizes are provided as examples and are not necessarily limiting. For instance, the antenna size can be varied across acceptable ranges as will be appreciated according to desired communication distances and any associated active modulation capabilities.

In certain embodiments, the RFID tag device is designed for use with RFID protocols that are designed to be used with credit card-sized form factors. Such form factors generally allow for significantly larger antennas, which generally results in significantly larger antenna gains. Aspects of the present disclosure recognize that the limiting factor on effective communication distances between an RFID reader device and an RFID tag device is generally based upon communications from the RFID tag device to the RFID reader device (e.g., because the protocol presumes that RFID tag device uses load modulation). Certain embodiments are therefore directed toward increasing the effective communication distance by actively driving an RF signal from the RFID tag device in a manner that mimics load modulation by an RFID tag device with a larger antenna gain.

Embodiments are directed toward an RFID tag device that synchronizes a local clock to a received RF carrier. Particular aspects are directed toward the use of an initial period where the RF carrier field is provided for a set amount of time (e.g., 5 ms) before data (e.g., a command) is transmitted. During this initial period, the RFID tag device detects differences in frequency and/or phase between a locally-generated clock and the received RF carrier. The RFID tag adjusts the locally generated clock in response to the detected differences and thereby synchronizes the locally generated clock to the received RF carrier. Once the initial period completes, the RFID tag device can disable the clock adjustment and maintain the locally generated clock according to the current frequency and phase. This can be particularly useful for avoiding clock mismatches due to the RFID reader device modulating the RF carrier during data transmission.

Figure 1:
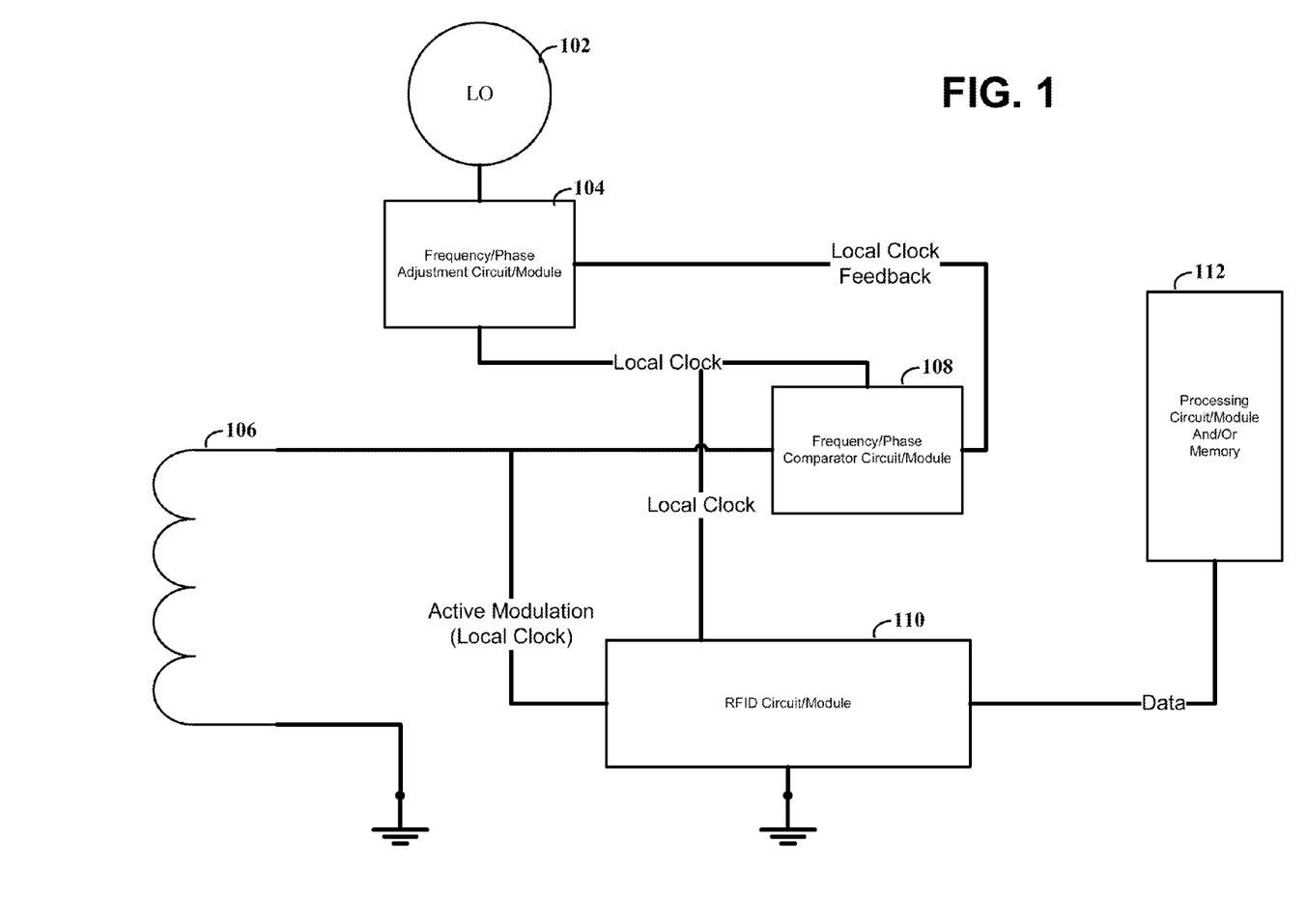
FIG. 1 depicts a block diagram of a system for an RFID tag device, consistent with embodiments of the present disclosure.

Turning now to the figures, FIG. 1 depicts a block diagram of a system for an RFID tag device, consistent with embodiments of the present disclosure. Antenna 106 can be configured to receive, from an RFID reader device, an RF carrier signal, an RF command and/or other RF data. A local oscillator (LO) circuit 102 (e.g., a crystal oscillator circuit) generates a local clock signal. Frequency/phase adjustment circuit/module 104 adjusts the frequency and/or phase of the local clock signal in response to a feedback signal. Frequency/phase comparator circuit/module (comparison module) 108 can be configured to compare the local clock (as adjusted by frequency/phase adjustment circuit/module 104) to the RF carrier received from antenna 106. The detected difference (if any) is used to generate a local clock feedback signal that is provided to frequency/phase adjustment circuit 104.

In certain non-limiting examples, frequency/phase adjustment circuit 104 can operate as a voltage controlled oscillator circuit (VCO) or as a current controlled oscillator (ICO). The local clock feedback signal can be configured accordingly (e.g., with a voltage or current representing a desired change to the local clock).

RFID circuit/module 110 can be configured to demodulate data/commands received from wireless communications picked up by antenna 106. This can include read/write commands for accessing data stored in the RFID tag device. RFID circuit 110 can also be configured to actively drive an RF signal out on the antenna 106 (as opposed to load modulating a received RF signal). RFID circuit 110 can use the local clock to produce the RF signal being driven out on the antenna 106. More particularly, RFID circuit 110 can use the local clock as a basis point to generate a modulated output that mimics load modulation of the RF signal received from the antenna 106. This can be particularly useful for communicating with an RFID reader device that uses a protocol designed for load modulation (e.g., and not for active modulation).

The data represented by the modulation of RFID circuit 110 can be provided by processing/memory circuit/module 112. Processing/memory circuit 112 can include active processing circuits (e.g., microprocessors and/or logic circuitry) and/or memory circuits. For instance, circuit 112 could be a memory storage circuit to which the RFID circuit 110 can read and write. In another instance, circuit 112 can include a processing circuit that handles access requests and that can be configured to perform complex processing and decisions in response.

Particular embodiments are based upon the recognition that, for longer frames, a clock difference of only a few parts per million (ppm) between the tag and the reader can cause communications to be unstable. For example, stable data communications for frame lengths of 256 bytes cannot be guaranteed unless the frequency difference between the clocks of the two systems is less than 2 ppm. In order to maintain stable communication for different modulation coding, such as binary phase-shift keying (BPSK) coded subcarrier load modulation, a phase shift of less than +−30°/carrier may be necessary. Accordingly, the RFID tag device can be configured and arranged to these, or similar, requirements.

Figure 2:
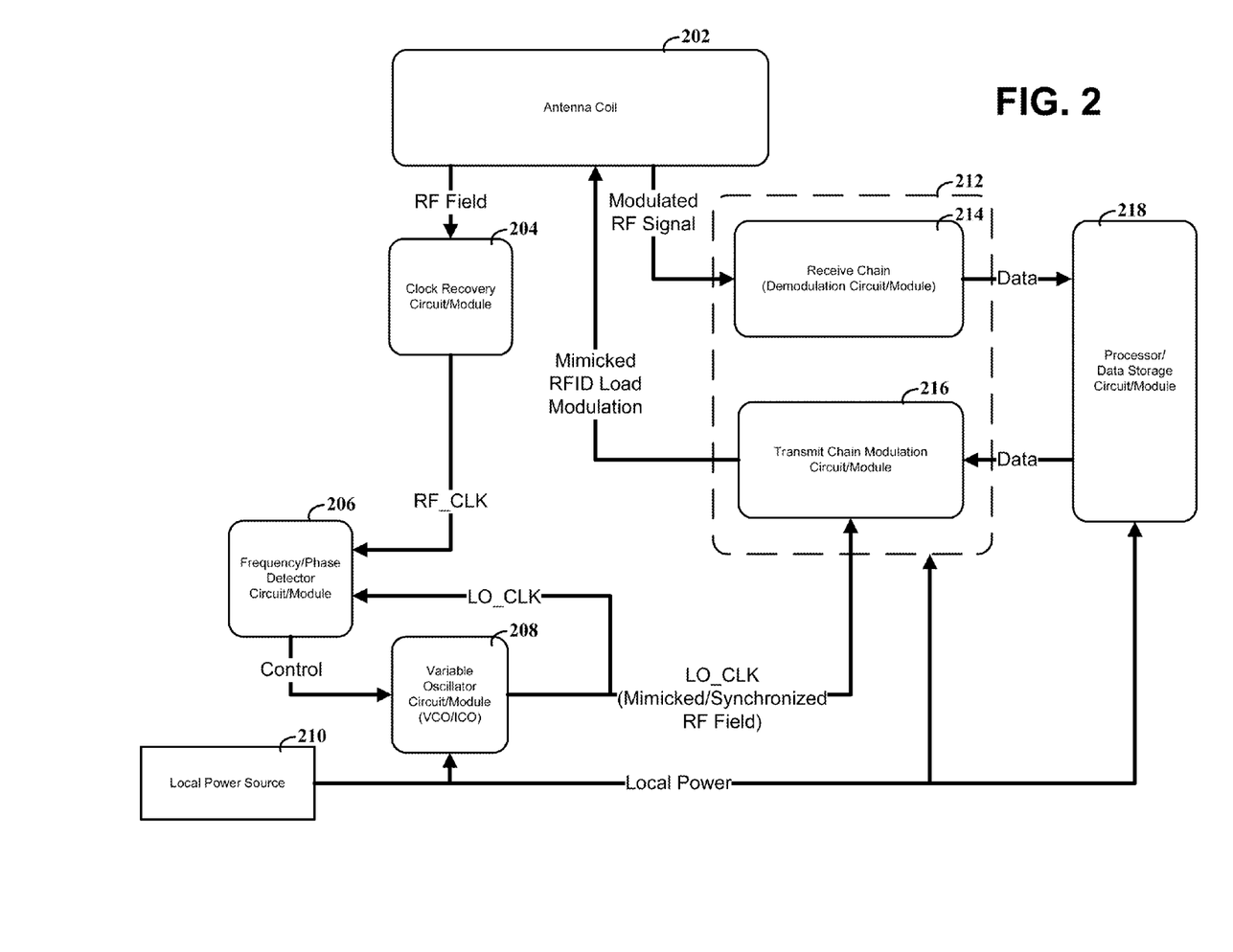
FIG. 2 depicts a block diagram of an RFID tag device that includes receive and transmit changes, consistent with embodiments of the present disclosure.

FIG. 2 depicts a block diagram of an RFID tag device that includes receive and transmit changes, consistent with embodiments of the present disclosure. Antenna coil 202 can be configured and arranged to receive and transmit RF signals between the RFID tag device and an RFID reader device. An RF field received on antennal coil 202 (from an RFID reader device) is provided to clock recover circuit/module 204, which can be configured to recover a clock signal (RF_CLK) corresponding to the RF carrier in the RF field. A variable local oscillator circuit/module 208 generates a local clock (LO_CLK). Frequency/phase detector circuit/module 206 detects differences in frequency and/or phase of the RF_CLK and LO_CLK signals. A control signal is generated based upon the detected difference. This control signal is provided to the variable oscillator circuit 208 (e.g., a VCO or ICO) in order to synchronize the RF_CLK and LO_CLK.

The RFID tag device can include an RFID component 212. In certain embodiments, this component can be a separate integrated circuit (IC) chip that is part of the larger RFID tag device. Embodiments also contemplate RFID component 212 being part of an IC chip that includes one or more addition circuits including, but not limited to, the circuits and modules depicted in FIG. 2. Moreover, the RFID tag device itself can be part of a larger device, such as a smart phone. RFID component 212 can receive a modulated RF signal from antenna coil 202. Receive chain 214 can be configured to demodulated the modulated RF signal and to thereby produce data. For instance, receive chain 214 can demodulate the modulated RF signal so as to produce a read command that requests access to data stored in the processor/data storage circuit/module 218.

RFID component 212 can also include a transmit chain (circuit/module) 216. Transmit chain 216 can be configured and arranged to generate and drive an RF modulated signal for wireless broadcasting using antenna coil 202. This modulation is carried out using the LO_CLK signal to mimic the RF carrier signal received from antenna coil 202 and originating from an RFID reader device. By synchronizing the LO_CLK to the received RF carrier, the LO_CLK can be used as a reference signal for mimicking load modulation of the RF carrier. The resulting signal is actively driven to antenna coil 202. The presence of local power 210 facilitates the ability to generate a stable LO_CLK and also provides power for driving the signal to the antenna coil 202.

Consistent with embodiments, the drive strength (e.g., the amplitude) of the mimicked RFID signal can be set according to the gain of antenna coil 202. For example, limitations on the size of antenna coil 202 may result in a relative low gain. To compensate for this low gain, the drive strength of the mimicked RFID signal can be set sufficiently high. This can be particularly useful for increasing the distance at which communications can take place between the RFID tag and reader devices. According to various embodiments, the drive strength can be actively varied in response to relevant inputs. As an example, the strength of the received RF field may be indicative of the desired drive strength. For instance, a weak RF field may indicate a large distance between the RFID tag and reader devices and suggest that more drive strength is desirable.

Consistent with certain embodiments of the present disclosure, the RFID tag device is configured and arranged to disable the control input to the variable oscillator circuit 208 in response to determining that the received RF field contains modulated data. For instance, RFID reader devices can be configured to generate an RF field for a set amount of time (e.g., 5 ms) before transmitting data by modulating the RF field. RFID tag device can detect the presence of data/modulation, and in response, fix the frequency/phase of the LO_CLK at its current setting. In certain embodiments, the receive chain 214 can be configured to perform this detection and to provide a control signal for locking the frequency and phase of the LO_CLK.

Figure 3:
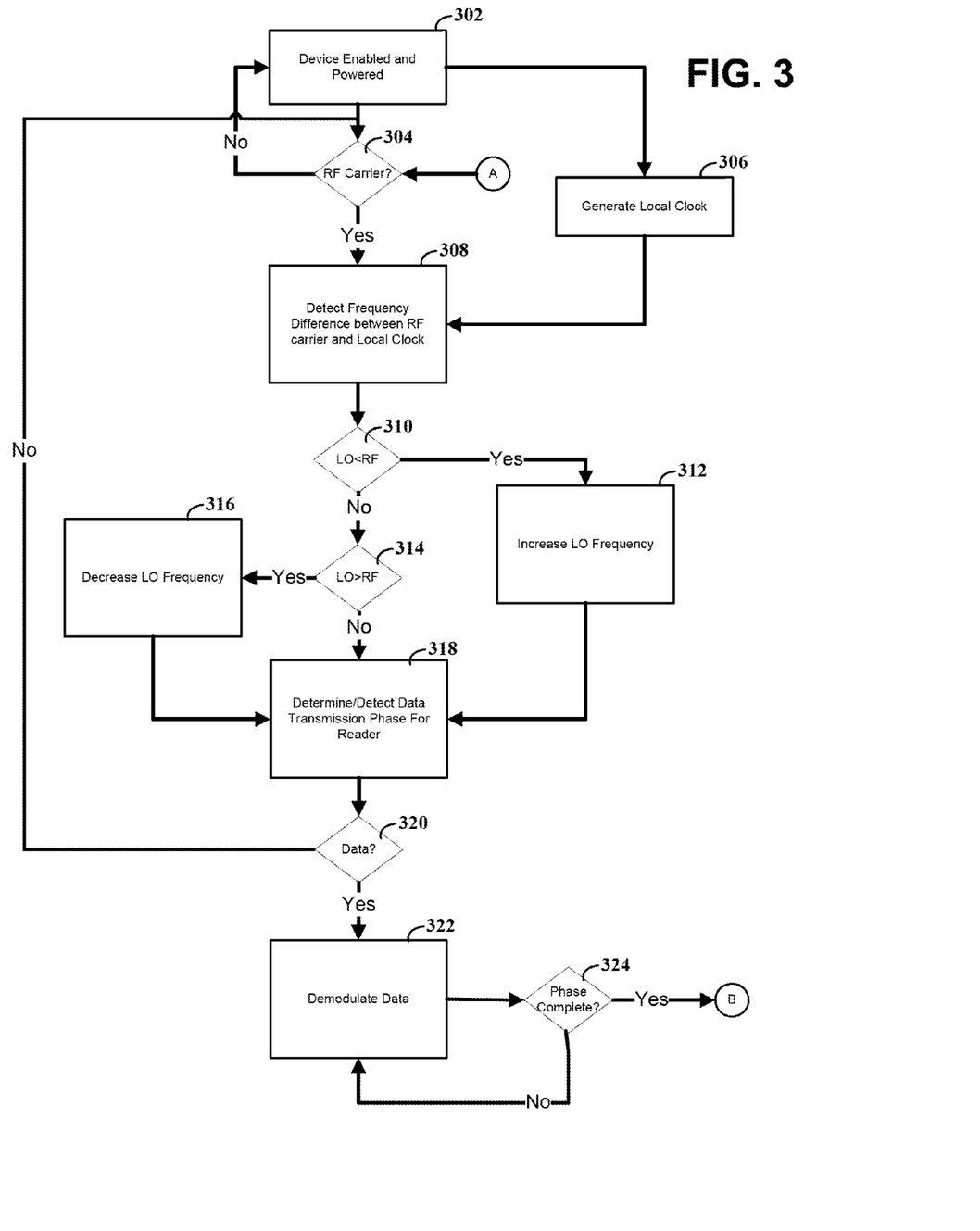
FIG. 3 depicts a flow diagram for a process capable of being used in connection with an RFID tag device, consistent with embodiments of the present disclosure.

FIG. 3 depicts a flow diagram for a process capable of being used in connection with an RFID tag device, consistent with embodiments of the present disclosure. At block 302, the RFID tag device is enabled and/or powered. A local clock can then be generated as shown in block 306. Decision block 304 represents the presence or absence of a received RF carrier (e.g., from an RFID reader device). If an RF carrier is present, then the RF tag device can detect differences (frequency and/or phase) between the RF carrier and the locally generated clock, as shown by block 308.

Decision block 310 represents a determination as to whether or not the frequency of the local clock (LO) is less than the frequency of the RF carrier. If the LO frequency is less, then the LO frequency can be increased as shown by block 312. Decision block 314 represents a determination as to whether or not the LO frequency is greater than the frequency of the RF carrier. If the LO frequency is greater, then the LO frequency can be decreased as shown by block 316. Similar adjustments can be made depending upon determinations as to whether or not the phase of the LO signal leads or lags the RF carrier signal.

At block 318, the RF tag device can determine whether or not data transmission (and associated RF carrier modulation) has begun. Decision block 320 uses the detection to determine whether or not data is present. If data is not present, then the frequency/phase adjustment loop, beginning at block 308, is continued. If data is present, the frequency/phase adjustment can be stopped and the LO signal can be maintained at its current frequency and phase relationship.

Block 322 shows the demodulation of data received in the RF field. Decision block 324 represents a determination as to whether or not the demodulation phase is complete. If the demodulation phase is not complete, then the RFID tag device can continue to demodulate the data (block 322). If, however, the demodulation phase is complete, then the process can proceed to node B, which is also present in FIG. 4.

Figure 4:
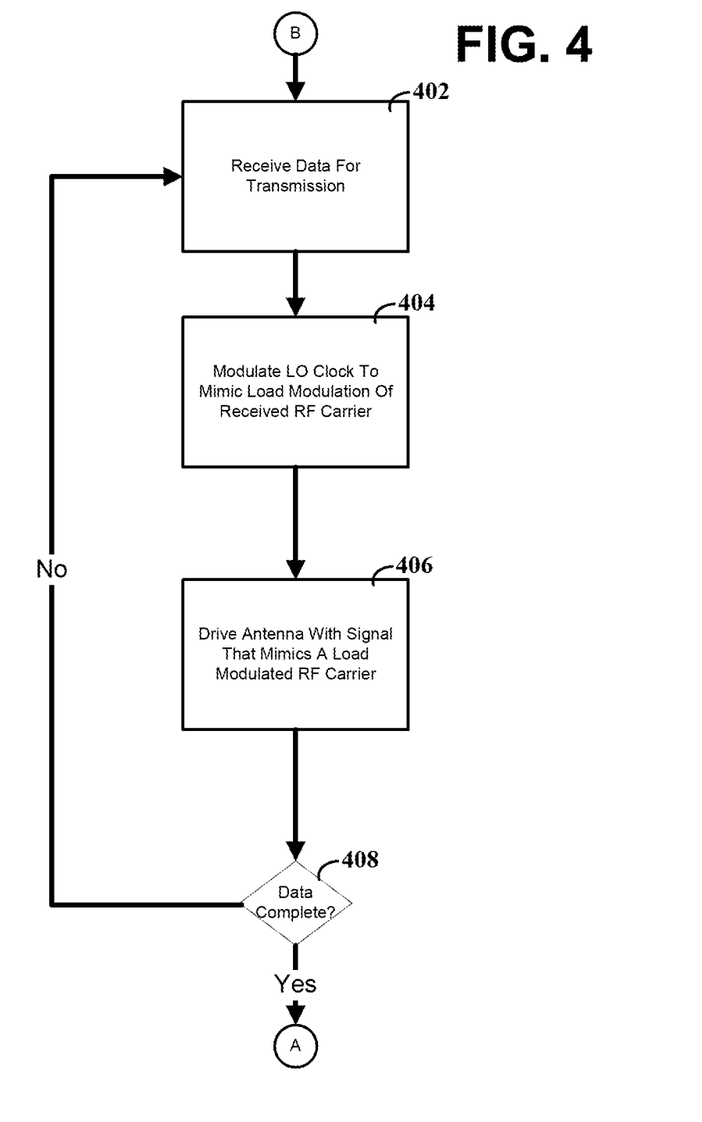
FIG. 4 also depicts a flow diagram for a process capable of being used in connection with an RFID tag device, consistent with embodiments of the present disclosure.

FIG. 4 also depicts a flow diagram for a process capable of being used in connection with an RFID tag device, consistent with embodiments of the present disclosure. At block 402, data is received that is designated for transmission over the RFID interface. At block 404, the RFID tag device creates a modulated signal designed to mimic load modulation of the received RF carrier. For instance, the LO signal/clock can be modulated according to the desired modulation scheme. The modulation schemes can include, but are not necessarily limited to, BPSK and Manchester coding (with or without sub carriers). At block 406, the modulated signal is then used to drive the antenna so as to mimic load modulation of the RF carrier (e.g., load modulation using an antenna with a larger gain). Decision block 408 represents a determination as to whether or not the data transmission is complete (e.g., there is no additional data to be transmitted). If the data transmission is not complete, then the data modulation process can continue (at block 402). If the data transmission is complete, then the process can return to node A, which is also present in FIG. 3.

Embodiments of the present disclosure recognize that active modulation may not be necessary in all situations. For instance, if the RFID tag and reader devices are sufficiently close, then (passive) load modulation may be acceptable. Accordingly, embodiments of the present disclosure are directed toward an RFID tag device that can be configured to use both active and passive modulation. In a particular embodiment, the RFID tag device can detect the strength of the received RF field and then select between active and passive modulation based upon whether or not the RF field strength is sufficient for passive modulation.

In other instances, the RFID tag may switch between active and passive modulations based upon other factors. One such factor can include the failure of previous communication attempts. In response to such failure, the RFID tag can select an alternate modulation from the previously used modulation. For instance, the RFID tag can begin by using passive load modulation that fails to be received by the RFID reader due to the distance from the RFID tag (which may have a relatively small antenna). The RFID tag can then switch to active modulation, which allows for increased RF amplitude on the antenna. This can lead to an increase in the effective communication distance. In certain embodiments, the drive strength for active modulation can be modified based upon similar factors. This can include increasing or decreasing based upon a received RF field strength and/or increasing or decreasing in response to whether or not outing data transmissions are successful.

Various modules and/or other circuit-based building blocks may be implemented to carry out one or more of the operations and activities described herein and/or shown in the figures. In such contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, the a device could be used with protocols other than current version of ISO/IEC 18000. Such modifications do not depart from the true spirit and scope of various aspects of the disclosure, including aspects set forth in the claims.

What is claimed is:

1. A method of wireless communication with a circuit that includes a radio frequency identification (RFID) reader, the circuit configured and arranged to communicate with RFID cards that use load modulation of an RF carrier provided by the RFID reader, the method comprising:
   detecting a presence of the radio frequency (RF) carrier on an antenna;
   generating a local clock signal;
   detecting a difference in at least one of frequency and phase between the local clock signal and the RF carrier;
   modifying, in response to the detected difference, the frequency of the local clock signal to reduce the detected difference; and
   communicating data to the RFID reader by
      modulating the local clock signal to encode data; and
      actively driving the antenna with the modulated local clock signal and therein increasing effective communication distance of the antenna, wherefrom the circuit communicates with RFID cards that use load modulation of the RF carrier provided by the RFID reader, and wherein the active driving of the antenna with the modulated local clock signal occurs while the RF carrier is present on the antenna.

2. The method of claim 1, wherein the step of modulating uses one of binary phase shift keying (BPSK) and Manchester coding.

3. The method of claim 1, further including a step of demodulating data received on the antenna.

4. The method of claim 1, wherein the antenna is less or equal to about 510 $mm^2$ in size.

5. The method of claim 1, wherein the antenna is less or equal to about 100 $mm^2$ in size.

6. The method of claim 1, wherein the step of generating the local clock signal includes using a crystal oscillator circuit.

7. The method of claim 1, wherein the step of modifying the frequency of the local clock signal includes using one of a voltage controlled oscillator circuit and a current controlled oscillator circuit.

8. The method of claim 1, wherein the encoded data has a frame length of at least 256 bytes and wherein the step of modifying the frequency of the local clock signal to reduce the detected difference includes reducing the detected difference to less than about 2 ppm.

9. The method of claim 1, further comprising adjusting a drive strength of a driver used to actively drive the antenna based on a field strength of the RF carrier.

10. The method of claim 1, further including the steps of
   determining a beginning of a data transmission phase for the RFID reader, and
   locking, in response to determining the beginning of the data transmission phase, the local clock signal at a current frequency.

11. A device comprising:
   a local oscillator circuit configured and arranged to generate a local clock signal;
   a comparison module configured and arranged to
      detect a difference in at least one of frequency and phase of the local clock signal and a wirelessly received radio frequency (RF) carrier, and
      generate a control signal in response to the detected difference;
   an adjustment module configured and arranged to reduce the detected difference in response to the control signal; and
   an RFID module configured and arranged to communicate data to an RFID reader generating the RF carrier by
      modulating the local clock signal to encode data; and
      actively driving an antenna with the modulated local clock signal and therein increasing effective communication distance of the antenna, wherefrom the RFID module is configured and arranged to mimic load modulation of the carrier, and wherein RFID module is further configured and arranged to drive the antenna with the modulated local clock signal while the RF carrier is present on the antenna.

12. The device of claim 11, wherein the RFID module is further configured and arranged to use one of binary phase shift keying (BPSK) and Manchester coding.

13. The device of claim 11, wherein the RFID module is further configured and arranged to demodulate data received on the antenna.

14. The device of claim 11, wherein device includes the antenna and wherein the antenna is less or equal to about 510 mm$^2$ in size.

15. The device of claim 11, wherein device includes the antenna and wherein the antenna is less or equal to about 100 mm$^2$ in size.

16. The device of claim 11, wherein the local oscillator circuit includes a crystal oscillator circuit.

17. The device of claim 11, wherein adjustment module includes one of a voltage controlled oscillator circuit and a current controlled oscillator circuit.

18. The device of claim 11, wherein the encoded data has a frame length of at least 256 bytes and wherein the adjustment module is further configured and arranged to reduce the detected difference to less than about 1 ppm.

19. The device of claim 11, wherein the comparison module is configured and arranged to respond to a data transmission phase for the RFID reader, and to lock, in response to a beginning of the data transmission phase, the local clock signal at a current frequency.

20. The device of claim 11, wherein the RFID module is configured to adjusting a drive strength used to actively drive the antenna based on a field strength of the RF carrier.

* * * * *